United States Patent [19]
Silva et al.

[11] Patent Number: 5,317,385
[45] Date of Patent: May 31, 1994

[54] PORTABLE EXTENDED LIFE METROLOGY SYSTEM FOR MEASURING SCALE DISPLACEMENT WITH THREE OUTPUT SIGNALS USING A PULSED SOURCE

[75] Inventors: John R. Silva, Rehoboth; Geert J. Wyntjes, Chelsea, both of Mass.

[73] Assignee: Federal Products Corporation, Providence, R.I.

[21] Appl. No.: 991,441

[22] Filed: Dec. 16, 1992

[51] Int. Cl.$^5$ .............................................. G01B 9/02
[52] U.S. Cl. .............................. 356/356; 250/231.16; 356/345
[58] Field of Search ....................... 356/345, 356, 358; 250/231.16, 237 G

[56] References Cited

U.S. PATENT DOCUMENTS

| | | |
|---|---|---|
| 3,523,735 | 8/1970 | Taylor . |
| 4,631,416 | 12/1986 | Trutna, Jr. . |
| 4,676,645 | 6/1987 | Taniguchi et al. . |
| 4,710,026 | 12/1987 | Magone et al. . |
| 4,728,193 | 3/1988 | Bartelt et al. . |
| 4,764,014 | 8/1988 | Makosch et al. . |
| 4,776,698 | 10/1988 | Crosdale .............................. 356/345 |
| 4,776,701 | 10/1988 | Pettigrew . |
| 4,815,850 | 3/1989 | Kanayama et al. . |
| 4,815,854 | 3/1989 | Tanaka et al. . |
| 5,098,190 | 3/1992 | Wijntjes ............................... 356/356 |

OTHER PUBLICATIONS

Lawrence Mertz "Complex interferometry" *Applied Optics*, vol. 22, No. 10, May 15, 1983, pp. 1530-1533.
M. Hercher, Geert Wyntjes "Proceedings of SPIE-The International Society" Design of Optical Systems *Proceedings of SPIE* vol. 741, Jan. 1987, pp. 174-184.

Primary Examiner—Samuel A. Turner
Assistant Examiner—Peter J. Rashid
Attorney, Agent, or Firm—Morse, Altman, Dacey & Benson

[57] ABSTRACT

A portable extended life metrology system is disclosed. The system is of the kind which includes means for generating an interference fringe pattern as a function of a parameter to be measured, transducer apparatus for simultaneously generating three intensity-modulated optical signals, $I_R$, $I_S$ and $I_T$ that are related to the interference fringe pattern; signal processing apparatus for accurately determining an aspect of the interference fringe pattern form the three signals; means for accumulating phase information proportional to the aspect of the interference fringe pattern; and means for converting the accumulated phase and aspect information to desired outputs indicative of the parameter to be measured. The system includes a pulsed drive circuit designed to minimize its power drain without affecting its measurement accuracy and an energy source connected by the pulsed drive circuit to a radiation source to power the same in two operative states: a low, standby mode and a higher operational mode, with incremental and self-adaptive switching therebetween. The pulsed drive circuit controls the energy per pulse, the pulse repetition rate, and returns residual energy to the energy source of the system.

12 Claims, 2 Drawing Sheets

PORTABLE EXTENDED LIFE METROLOGY SYSTEM FOR MEASURING SCALE DISPLACEMENT WITH THREE OUTPUT SIGNALS USING A PULSED SOURCE

BACKGROUND OF THE INVENTION

1. Field of the Invention

The present invention relates generally to metrology and more particularly, to interferometric measurement technology embodied in a portable extended life metrology system.

2. The Prior Art

Interferometric measurement technology is useful in a number of fields. For example, interferometric measurement technology is used in the precise measurement of the linear displacement of material components, such as in the manufacture of machined metal parts, optically finished components and semiconductor integrated circuits. In making such displacement measurements, two techniques are currently in wide use: laser interferometry, in which the displacement of a mirror (attached to the part whose displacement is to be measured) is measured with a precision on the order of 1/16-wavelength (about 1.5 microinches); and linear encoders, in which a scale is attached to the moving part, and its position is read out with a precision of the order of $\frac{1}{8}$ scale division (or about 126 microinches for a 1000 line/inch scale). The ultimate precision of this technique is on the order of 50 to 100 microinches. Laser interferometry is very accurate and precise but requires a stabilized laser, elaborate optical components, and considerable expertise in its application. Linear encoders are robust and simple to use, but are limited in their precision by (a) difficulty in interpolating to better than $\frac{1}{8}$-scale division, and (b) difficulty in manufacturing and reading out very fine scales (e.g. more than 2000 lines/inch).

In U.S. Pat. No. 5,098,190 that issued to Geert J. Wyntjes et al. on Mar. 24, 1992, a metrology system is disclosed that includes means for generating an interference fringe pattern as a function of a parameter to be measured, transducer apparatus for simultaneously generating three intensity-modulated optical signals, $I_R$, $I_S$ and $I_T$, that are related to the interference fringe pattern; signal processing apparatus for accurately determining an aspect of the interference fringe pattern from the three signals; means for accumulating phase information proportional to the aspect of the interference fringe pattern; and means for converting the accumulated phase and aspect information to desired outputs indicative of the parameter to be measured. The disclosure of said U.S. Pat. No. 5,098,190 is incorporated herein by reference.

As stated therein, transducer generated optical intensity signals, $I_R$, $I_S$ and $I_T$, which under ideal circumstances differ only in their phases $\Phi$, are expressed by the following relationships:

$$I_R = I_1 + I_2 \cos(\Phi - 2\pi/3), \quad (1)$$

$$I_S = I_1 + I_2 \cos(\Phi), \text{ and}$$

$$I_T = I_1 + I_2 \cos(\Phi + 2\pi/3),$$

from which the instantaneous value of the parameter of interest (such as the displacement of a scale relative to the transducer apparatus can be uniquely determined.

The specific relationship between scale position, x, and phase, $\Phi$, (the phase angle $\Phi$ carrying the basic interferometric measurement information, which in a typical case is lateral displacement, x) being given by:

$$\Phi = \Phi_0 + 2\pi x/d \text{ radians}, \quad (2)$$

where d is the separation between adjacent rulings on the scale, and $\Phi_0$ is a constant. In terms of R, S, and T (the electrical signals corresponding to the optical intensity signals $I_R$, $I_S$, and $I_T$, respectively), ratios A, B, and C are defined by:

$$A = (R-S)/(T-S) \quad (3)$$

$$B = (S-T)/(R-T), \text{ and}$$

$$C = (T-R)/(S-R).$$

Concerning these ratios, two factors are immediately obvious: (a) the ratios are independent of the DC light level, $I_1$ (since both numerators and denominators are differences between pairs of signals), and (2) they are independent of the AC- amplitude, $I_2$. In fact, combining equations (1) and (2), we find that the ratios are simple functions of the phase $\Phi$ alone:

$$A = 1 + \sqrt{3}/\tan \Phi, \text{ etc.} \quad (4)$$

Metrology systems are useful in numerous fields, including lateral and angular displacement applications, velocity measurements, surface profile and contour measurements, and in applications involving the measurement of electric or magnetic field strengths.

In the said U.S. Pat. No. 5,098,190 the source of power, a regulated 5 VDC, was obtained from and constantly being supplied by an AC/DC converter system plugged into a 120 VAC outlet.

In the several applications mentioned above, a portability feature for the metrology system becomes highly desirable. Such portable feature is possible by the use of a battery. Commercially available batteries to provide the required 5 VDC power supply for the metrology system disclosed in said U.S. Pat. No. 5,098,190 have proven to last for about 6 hours of continuous operation. Thereafter, either the battery must be replaced, recharged or, as a practical matter due to the delicate nature of the instrument embodying the metrology system, the instrument must be replaced with a new one.

A much more desirable alternative is to provide a portable extended life metrology system having an extended useful battery life, a system that is capable of useful life for about one year.

THE INVENTION

It is principal object of the present invention to overcome the above disadvantages by providing a portable extended life metrology system employing commercially available batteries and incorporating power conserving features into the system.

More specifically, it is an object of the present invention to provide a portable extended life metrology system of the kind disclosed in said U.S. Pat. No. 5,098,190 and herein provided with a battery and built-in power conserving features that minimize power drain without affecting measurement accuracy. The system includes means for generating an interference fringe pattern as a function of a parameter to be measured, transducer apparatus for simultaneously generating three intensity-modulated optical signals, $I_R$, $I_S$ and $I_T$, that are related to the interference fringe pattern; signal processing apparatus for accurately determining an aspect of the interference fringe pattern from the three signals; means for accumulating phase information proportional to the aspect of the interference fringe pattern; and means for converting the accumulated phase and aspect information to desired outputs indicative of the parameter to be measured. Electrical signals, denoted R, S, and T, correspond to the these intensity-modulated optical signals $I_R$, $I_S$ and $I_T$, respectively.

The system of the invention, provided with the built-in power conserving features, includes a pulsed drive circuit comprising a variable frequency pulse generator circuit coupled between the output of the transducer apparatus and a radiation source and a comparator circuit coupled to the means for accumulating phase information and to the variable frequency pulse generator, and a primary energy supply to power the radiation source in a pulsed mode having a low standby update rate and an operational update rate, with a self-adaptive, incremental change therebetween. Logic elements and a timing control unit also are included to control the energy per pulse and the duty-cycle. When the rate of phase change exceeds a predetermined value, the operating frequency is switched to its high value to ensure that measurements remain valid and accurate. The radiation source, preferably a laser diode, preferably is charged through an inductor, allowing thereby any residual energy stored in the inductor to be returned to recharge the battery. Preferably, the metrology system is operated in a class B mode such that with no beam of radiation being detected by the detectors, no current is drawn from the battery. Preferably, the means for accumulating phase information includes, wherever possible, complementary metal oxide semiconductor (CMOS) electronics for processing and storage, assuring thereby that the current drain of the battery is further kept at a minimum.

Other objects of the present invention will in part be obvious and will in part appear hereinafter.

The invention accordingly comprises the portable extended life metrology system of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following detailed description, which is to be taken in connection with the accompanying drawings, wherein.

DETAILED DESCRIPTION OF THE PREFERRED EMBODIMENT

Figure 1:
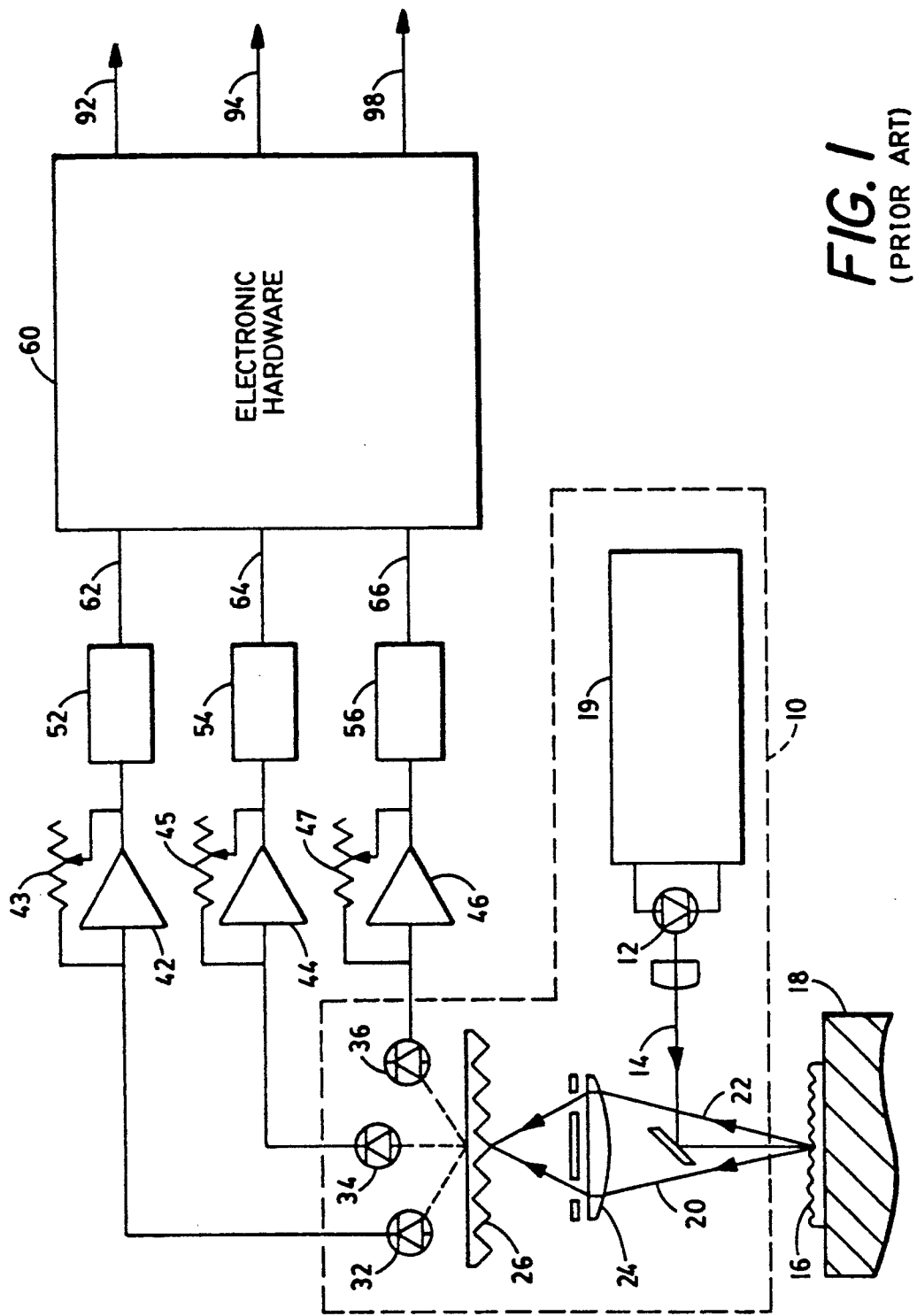
FIG. 1. is a block diagram of a prior art metrology system as disclosed in said U.S. Pat. No. 5,098,190.

In general, the present invention pertains to a metrology system of the kind which includes means for generating an interference fringe pattern as a function of a parameter to be measured, transducer apparatus for simultaneously generating three intensity-modulated optical signals, $I_R$, $I_S$ and $I_T$, that are related to the interference fringe pattern; signal processing apparatus for accurately determining an aspect of the interference fringe pattern from the three signals; means for accumulating phase information proportional to the aspect of the interference fringe pattern; and means for converting the accumulated phase and aspect information to desired outputs indicative of the parameter to be measured, as more fully disclosed in said U.S. Pat. No. 5,098,190, the disclosure of which already has been incorporated herein by reference.

As stated in said U.S. Pat. No. 5,098,190, FIG. 1. is a block diagram of a measurement system in accordance with the invention disclosed therein. Sensor head 10 includes laser diode 12 which produces a single beam 14 of linearly polarized light that illuminates ruled scale reflective grating (linear encoder) 16 (1250 lines/inch) which is attached to surface 18 to be observed. If desired, the laser diode 12 can be protected from optical feedback by the insertion of an optical isolator (not shown) located along beam path 14. The laser diode 12 has an estimated lifetime for use at ambient temperatures in excess of 40,000 hours. Power requirements are modest and power supplies can be obtained on single chips from the same manufacturers that make the diodes. Diode 12 typically requires a 5 VDC supply 19 and draws approximately 100 milliamperes to produce a ten milliwatt laser output.

Two diffracted beams 20, 22, at equal angles on either side of the incident beam 12, are directed by lens 24 to form an interference fringe pattern in the plane of lenticular grating 26 on special triphase detector array. As the surface 18 and attached scale 16 move laterally, the optical paths for the two diffracted beams 20, 22 are differentially changed-causing the interference fringe pattern 28 in the plane of the lenticular grating 26 to move laterally. The laterally. The optical design of the system makes it inherently insensitive to out-of-plane motions of the surface (excessive out-of-plane displacements will eventually cause loss of signal). The light which is refracted and diffracted by lenticular grating 26 produces three phase-shifted signals that fall on three approximately positioned silicon PIN-detectors 32, 34, 36. The relatively large signal levels from the detectors are applied to preamps 42, 44, 46 that have adjustable gains 43, 45, 47, respectively, which are set to generate the balanced signal R, S, and T on lines 62, 64, 66, each signal being band-limited by a low-pass filter 52, 54, 56, respectively, with a uniform response from DC to half the desired sampling frequency.

In one embodiment, three comparators follow the filters 52, 54, 56 and serve to address a high-speed analog switching unit by making determinations of the Boolean quantities (R>T), (S>R), and T>S). These Boolean values are then processed by a logical switching unit which determines which of the signals (R, S, T) are sent to which terminals ($V_{in}$, $V_{ref}$, $V_o$) of a 16-bit analog to digital converter. The analog to digital converter generates digital ratios $A=(R-T)/(S-T)$ etc. The update rate of the analog to digital converter is set by a clock whose speed defines the sampling rate. The 16-bit data stream form the analog to digital converter is combined with a 3-bit data stream from 3-bit logic unit (which determines in which sextant the phase angle lies) to provide a 19-bit input to an output digital to analog converter which defines the measured phase angle modulo $2\pi$.

In another embodiment, the balance signals R, S, and T from low-pass filters 52, 54, 56 are applied on lines 62, 64, 66 to electronic hardware 60, and outputs are produced on lines 92, 94 and 98.

The output data can be recorded either in digital signal form or, after conversion by a high-speed digital to analog converter, as an analog signal. The analog output can serve as the input to standard laboratory instruments, for example a real-time (FFT) spectrum analyzer, or it can be recorded for subsequent analysis.

Figure 2:
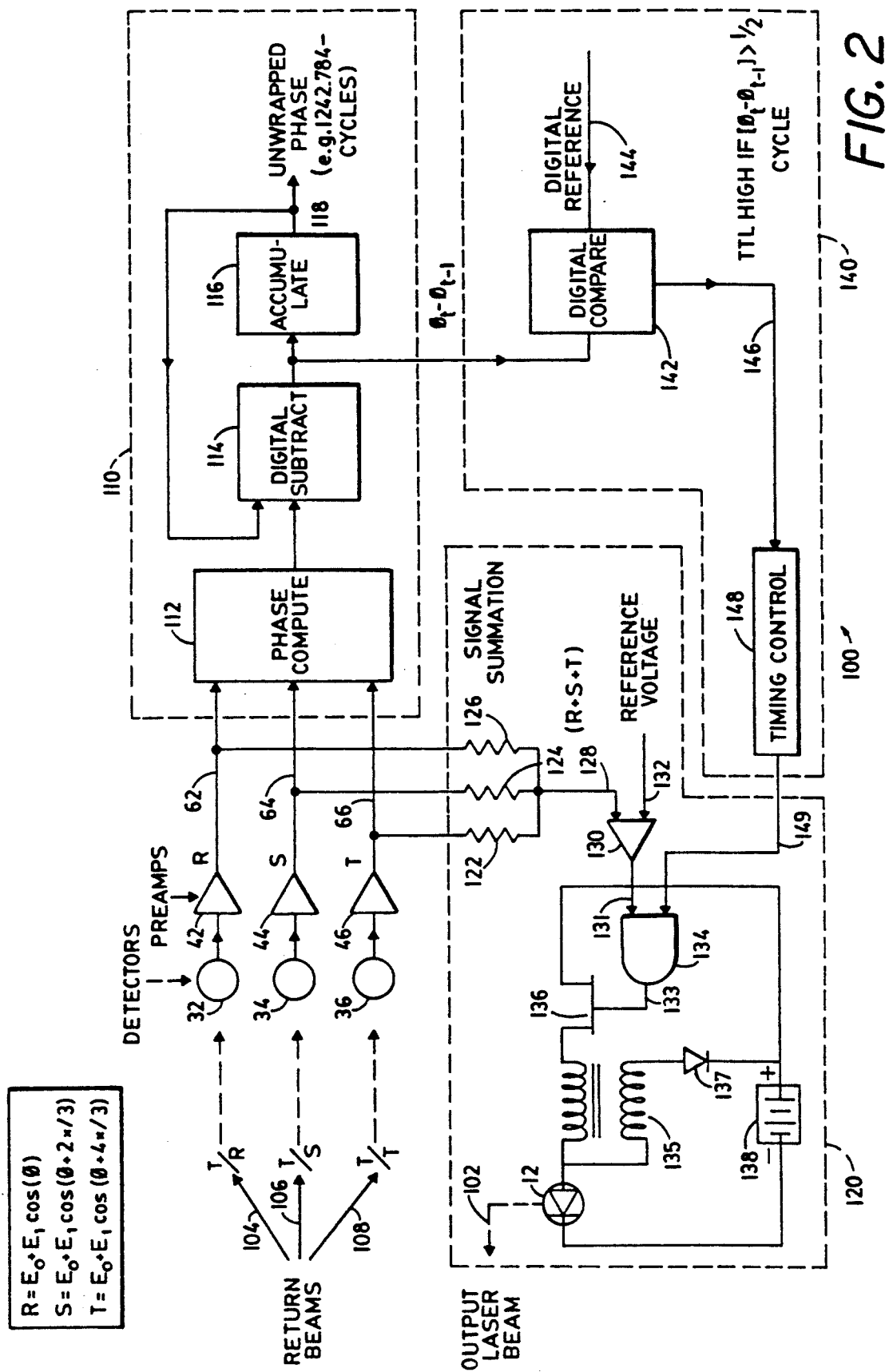
FIG. 2. is a block diagram of a metrology system in accordance with the invention.

FIG. 2 is a block diagram of a metrology system 100 constructed in accordance with and embodying the present invention. It is of the kind as shown in FIG. 1. herein and as more fully disclosed in said U.S. Pat. No. 5,098,190, the disclosure of which already has been incorporated herein by reference. Some relevant features of this prior art metrology system include, inter alia, the fact that while the measurements are made interferometrically, the optical path differences are kept very close to zero. As a consequence, measurements are independent of the wavelength of the laser diode - at least over the range within which the laser wavelength is likely to change. This fact means that the measurement accuracy is unaffected by any wavelength changes associated with pulsed operation of the laser diode.

A further important fact is that the interferometric measurement uses an extended spatial fringe pattern and three interleaved arrays of detectors. The three detector arrays are monitored separately and simultaneously in order to provide the three independent interferometric phase measurements that are needed to make the position measurement. The simultaneous and essentially instantaneous measurement of these three phases make it possible to make such measurements using a pulsed light source.

The metrology system 100 of the invention uses the laser diode 12 in a pulsed mode so as to provide an output laser beam 102 which is pulsed. It is this pulsed laser beam 102 which illuminates the ruled scale reflective grating (linear encoder) 16 of FIG. 1 (1250 lines/inch), shown attached to surface 18 to be observed.

Again, two diffracted beams 20, 22, at equal angles on either side of the incident pulsed laser beam 102, are directed by lens 24 to form an interference fringe pattern in the plane of lenticular grating 26. As the surface 18 and attached scale 16 move laterally, the optical paths for the two diffracted beams 20, 22 are differentially changed-causing the interference fringe pattern 28 in the plane of the lenticular grating 26 to move laterally. The light which is refracted and diffracted by lenticular grating 26 produces three phase-shifted optical intensity signals 104, 106 and 108 ($I_R$, $I_S$ and $I_T$, respectively) that fall on three approximately positioned silicon PIN-detectors 32, 34, 36. The relatively large signal levels from the detectors are applied to preamps 42, 44, 46 that preferably have adjustable gains, not shown, which are set to generate the balanced electrical signals R, S, and T on lines 62, 64, 66. These electrical signals R, S, and T correspond to the optical intensity signals $I_R$, $I_S$ and $I_T$, respectively, and are used in the system 100 of the invention as the signals R, S and T, and $I_R$, $I_S$ and $I_T$ are employed in said prior art disclosure of U.S. Pat. No. 5,098,190.

The electrical signals R, S and T are applied to a phase processor apparatus 110, which can be similar to the phase processor 60 described in said U.S. Pat. No. 5,098,190, or it can be as shown in FIG. 2 herein. Phase processor apparatus 110 as shown in FIG. 2 essentially comprises a phase compute circuit 112, a digital subtract circuit 114 and an accumulate circuit 116 whose output 118 also connects in a feedback loop to the digital subtract circuit 114.

As known, laser diodes are efficient converters of electric current, power into photons with slope efficiencies as high as 5 to 10% above the so called thereshold current, $I_{th}$. Above this current the laser action begins producing light that can be efficiently utilized to make the measurement. Unfortunately, threshold currents for available laser diodes are still fairly high, 25 to 50 milliamps or higher, making continuous, CW, operation impractical for a battery operated sensor. By using the laser diode in a pulsed mode at a low repetition rate, (low duty cycle) high conversion efficiency is obtained with a low average current consumption. For example, for a laser diode with an $I_{th}=30$ ma and operating at a peak current $I_P=40$ ma, will produce about 2 to 3 mw of peak optical power. For a nominal pulse duration of 2 micro-second at a repetition rate $T=1$ KH$_Z$, it will then draw about 80 microamp on average from a battery.

A complicating factor of using laser diodes is that their threshold current and therefore their output power is a strong function of operating temperature, with a change of about $+30\%$ in $I_{th}$ for a temperature change from 0° to 60° C. To minimize power consumption, automatic level control is desirable. A simple technique to implement this is to charge the laser diode through an inductor from the battery, causing a linear current rise at a rate E/L (amp/sec), where E is the difference between battery voltage and the forward voltage drop across the laser diode. When the optical output signal reaches the desired level, e.g. after 2 micro-seconds, the signal levels are measured (strobed), stored in digital form and the charging process terminated. A convenient way to control the level is to sum the output from the three interleaved detector sections, therefore ridding ourselves of the fringe signal, making the measurement independent of scale position, then compare the level against a set point and when exceeded, terminate the charging process.

DUTY CYCLE CONTROL

The measurement as configured is incremental in terms of phase cycles or distance increments, e.g. 12 micron (0,5 mil). In order not to miss an increment (slip a fringe) the measurement update rate should be sufficient that this does not occur. Unfortunately this is highly dependent of the nature of the measurement, slow or fast motions (velocities). To design the sensor or update rate for the maximum anticipated velocity would be intolerable in terms of battery drain. To circumvent this, the measurement is made self adaptive. The proposed solution is to have a lower or standby update rate, just sufficient that under worst case acceleration, e.g. due to gravity or some other force, the displacement increment is less that the ambiguity increment. If this is exceeded by detection, the difference between a measurement of time t and $(t+1) \leq +\frac{1}{2}$ cycle, the update pulse rate can either be progressively or step wise (for the worst case condition) incremented so the limit is never exceeded. If the velocity returns to a lower level, the update rate can then be reduced again to the standby level. A useful example is the case where the maximum acceleration might be due to the effect of gravity on a free falling probe (with a scale attached to it) that reaches a terminal velocity based upon its length, thereby establishing the minimum update rate as well as a maximum update rate.

Two additional steps to conserve power are to recuperate the energy stored in the charging inductor, $\frac{1}{2} L I_P^2$ and returning it to the system. In practice, this amounts to about 30% of the energy per pulse.

Another step to conserve power is to operate the detection electronics in such a way, that when there is no light on the detectors, there is no current drain from the battery, sometimes called class B operation for electronic amplifiers.

A last step which contributes to low power consumption is the use of Complementary Metal Oxide Semiconductor (CMOS) electronics for processing and storage. A feature of CMOS is that there is a current being drawn only, when there is a logic transition (picocoulombs per transition). Consequently, by always keeping the measurement rate at a minimum, current drain is reduced.

In order to effect the above, the metrology system 100 of the invention incorporates a pulsed drive circuit designed to minimize the power drain on the system 100 without however adversely affecting its measurement accuracy. The pulsed drive circuit essentially comprises a variable frequency pulse generator circuit 120 and a comparator circuit 140. The variable frequency pulse generator circuit 120 is coupled via three summing resistors 122, 124 and 126 to the output leads 62, 64 and 66 of the preamplifiers 42, 44 and 46, conveying the electrical signals R, S and T which correspond to the optical intensity signals $I_R$, $I_S$ and $I_T$, respectively. With no fringe signal being present on leads 62, 64 and 66, the measurement is independent of scale position.

The summed signal (R+S+T) on lead 128 is inputted into a comparator 130 wherein it is compared against a set reference voltage 132. The output of the comparator 130 is connected via lead 131 to an AND gate 134, whose output on lead 133 is coupled to the base of a field effect transistor (FET) or other suitable device 136. A primary energy supply 138 is connected via an inductor 135 and a diode 137 to charge the laser diode 12 in a pulsed mode and to return the energy stored in the inductor 135 to the primary energy supply 138. The primary energy supply 138 comprises a battery or an isolated battery plus a capacitor, as required to accept the returned energy from the inductor 135. Supply 138 also is coupled into the drain-source circuit of the FET 136, as shown.

The comparator circuit 140 takes its input from the output of the digital subtract circuit 114 and inputs it into a digital compare circuit 142 where it is compared against a digital reference 144. The output of the digital compare circuit 142 on lead 146 is coupled to a timing control unit 148, whose output on lead 149 is coupled as the second input to the AND gate 134.

The pulsed drive circuit, just described, pulses the laser diode 12 so as to generate a pulsed output laser beam 102. The times of the pulse duration is just sufficient to ensure that measurements remain valid and with a resolution of at least about 1/16 - cycles, depending on the degree of interpolation. The rate of pulsing is just sufficient to avoid missing a displacement of $\frac{1}{2}$ per line spacing.

Thus it has been shown and described a portable extended life metrology system 100, which system satisfies the object and advantages set forth above.

Since certain changes may be made in the present disclosure without departing from the scope of the present invention, it is intended that all matter described in the foregoing specification or shown in the accompanying drawings, be interpreted in an illustrative and not in a limiting sense.

What is claimed is:

1. In a metrology system of the kind comprising:
   (a) a radiation source for directing a beam of radiation on a component whose parameter is to be measured, structure for producing two separate beams of radiation from portions of radiation modified by said component, optical structure for causing said two beams to interact and form an interference fringe pattern as a function of said parameter to be measured;
   (b) transducer apparatus responsive to said interference fringe pattern for simultaneously generating three intensity-modulated optical signals, $I_R$, $I_S$ and $I_T$, that are related to said interference fringe pattern, signal processing apparatus for accurately determining an aspect of said interference fringe pattern from said three signals;
   (c) means for accumulating phase information proportional to said aspect of said interference fringe pattern; and
   (d) means for converting said accumulated phase and aspect information to desired outputs indicative of said parameter to be measured;
   the improvement comprising:
   (e) a pulsed drive circuit designed to minimize power drain on said metrology system without affecting its measurement accuracy, said pulse drive circuit comprising:
   (f) a variable frequency pulse generator circuit coupled between the output of said signal processing apparatus and said radiation source to drive said source in a pulsed mode;
   (g) a comparator circuit coupled between said means for accumulating phase information and said variable frequency pulse generator circuit to control the energy per pulse and the pulse rate of said source in said pulsed mode; and
   (h) an energy source connected to said source to power said radiation source in said pulsed mode, including means to return residual energy to said system.

2. In the metrology system of claim 1 wherein said variable frequency pulse generator circuit includes logic elements and said comparator circuit includes a timing control unit connected to said logic elements to power said radiation source in said pulsed mode.

3. In the metrology system of claim 1, wherein said pulsed mode of said radiation source has two operative states: a low standby update rate and an operational update rate, with the change between the states being self-adaptive.

4. In the metrology system of claim 2 wherein said variable frequency pulse generator circuit further includes summing resistors connected to said transducer apparatus to sum the electrical signals R, S, T corresponding to said three intensity-modulated optical signals and coupling their sum to said logic elements, where said sum is compared against a reference voltage.

5. In the metrology system of claim 1, wherein said means to return said residual energy to said system comprises an inductor coupled between said energy source and said radiation source.

6. In the metrology system of claim 1 wherein said system is operated in class B mode such that with no beam of radiation being detected, no current is drawn from said battery.

7. In the metrology system of claim 1 wherein said means for accumulating phase information includes CMOS electronics for processing and storage.

8. In the metrology system of claim 5 wherein said logic elements include an FET whose drain-source circuit is connected between said radiation source and said energy source, a comparator and an AND-gate sequentially coupled to the base of said FET, the output of said comparator circuit forming a second input to said AND-gate, said comparator summing said there electrical signals R, S, T corresponding to said intensity-modulated optical signal, $I_R$, $I_S$ and $I_T$, and comparing their sum to a voltage reference.

9. In a metrology system of the kind comprising:
  (a) means for generating an interference fringe pattern as a function of a parameter to be measured, said interference fringe pattern generating means including a laser diode that has a narrow collimated output beam of radiation that is normally incident on the component whose parameter is to be sensed and produces two diffracted beams, and optical means for collecting and bringing said two diffracted beams together again form interference fringes;
  (b) transducer apparatus for simultaneously generating three intensity-modulated optical signals, $I_R$, $I_S$ and $I_T$, that are related to said interference fringe pattern;
  (c) signal processing apparatus for accurately determining an aspect of said interference fringe pattern from said three signals;
  (d) means for accumulating phase information proportional to said aspect of said interference fringe pattern; and
  (e) means for converting said accumulated phase and aspect information to desired outputs indicative of said parameter to be measured;
the improvement comprising:
  (f) a pulsed drive circuit comprising:
  (g) a variable frequency pulse generator circuit coupled between the output of said signal processing apparatus and said laser diode to drive said diode in a pulsed mode;
  (h) a comparator circuit coupled to said means for accumulating phase information and to said variable frequency pulse generator circuit; and
  (i) said variable frequency pulse generator circuit including an energy source and an inductor coupled between said energy source and said laser diode to charge said diode and to return energy stored in said inductor to said energy source.

10. In the metrology system of claim 9 including logic elements and a timing control unit to power said laser diode in said a pulsed mode, said mode having two operative states: a low rate and an operational rate, with switching therebetween being incremental and self-adaptive.

11. In the metrology system of claim 10 further including summing resistors coupled to said signal processing apparatus to sum the balanced electrical signals R. S, T corresponding to said three intensity-modulated optical signals to said logic elements for comparison against a reference voltage.

12. In the metrology system of claim 11 wherein said system is operated in class B mode and wherein said means for accumulating phase information includes CMOS electronics for processing and storage.

* * * * *